United States Patent
Okazaki et al.

(10) Patent No.: US 11,945,911 B2
(45) Date of Patent: Apr. 2, 2024

(54) POLYAMIC ACID, VARNISH CONTAINING SAME, FILM, TOUCH PANEL DISPLAY, LIQUID CRYSTAL DISPLAY, AND ORGANIC EL DISPLAY

(71) Applicant: Mitsui Chemicals, Inc., Tokyo (JP)

(72) Inventors: Masaki Okazaki, Chiba (JP); Kenichi Fukukawa, Tokyo (JP); Tatsuhiro Urakami, Ichihara (JP)

(73) Assignee: Mitsui Chemicals, Inc., Tokyo (JP)

(*) Notice: Subject to any disclaimer, the term of this patent is extended or adjusted under 35 U.S.C. 154(b) by 647 days.

(21) Appl. No.: 17/253,651

(22) PCT Filed: Jun. 20, 2019

(86) PCT No.: PCT/JP2019/024557
§ 371 (c)(1),
(2) Date: Dec. 18, 2020

(87) PCT Pub. No.: WO2019/244988
PCT Pub. Date: Dec. 26, 2019

(65) Prior Publication Data
US 2021/0261732 A1    Aug. 26, 2021

(30) Foreign Application Priority Data

Jun. 22, 2018 (JP) .................. 2018-118621

(51) Int. Cl.
*C08J 5/18* (2006.01)
*C08G 73/10* (2006.01)
*C09D 179/08* (2006.01)

(52) U.S. Cl.
CPC ..... *C08G 73/1042* (2013.01); *C08G 73/1082* (2013.01); *C08G 73/1085* (2013.01); *C08J 5/18* (2013.01); *C09D 179/08* (2013.01); *C08G 2150/00* (2013.01); *C08J 2333/24* (2013.01)

(58) Field of Classification Search
USPC .......................................... 528/170
See application file for complete search history.

(56) References Cited

U.S. PATENT DOCUMENTS

| | | |
|---|---|---|
| 2009/0088551 A1 | 4/2009 | Yamashita et al. |
| 2010/0304160 A1 | 12/2010 | Fukukawa et al. |
| 2015/0183931 A1 | 7/2015 | Fujii et al. |
| 2016/0032055 A1 | 2/2016 | Urakami et al. |

FOREIGN PATENT DOCUMENTS

| | | | | |
|---|---|---|---|---|
| CN | 104395376 | | 3/2015 | |
| JP | 5-31341 A | | 2/1993 | |
| JP | 2009-79165 A | | 4/2009 | |
| JP | 2016072246 A | * | 5/2016 | ............ B05D 7/04 |
| WO | 2009/069688 A1 | | 6/2009 | |
| WO | 2014/162734 A1 | | 10/2014 | |
| WO | WO-2014162734 A1 | * | 10/2014 | ........... B32B 27/281 |

OTHER PUBLICATIONS

WO 2014162734 machine translation. (Year: 2016).*
JP 2016072246 A machine translation (Year: 2016).*

* cited by examiner

*Primary Examiner* — Terressa Boykin
(74) *Attorney, Agent, or Firm* — RANKIN, HILL & CLARK LLP

(57) ABSTRACT

The purpose of the present invention is to provide: a film having high thermal stability, high bending strength (tensile elongation), small retardation in the thickness direction, a low coefficient of thermal expansion, and high transparency; and a polyamic acid or varnish for obtaining the film. The film satisfies all of requirements (i)-(vi) below. (i) The average value of the coefficient of thermal expansion in the range of 100-200° C. is 35 ppm/K or less. (ii) The absolute value of the retardation in the thickness direction is 200 nm or less per 10 μm of thickness. (iii) The glass transition temperature is 340° C. or higher. (iv) The total light transmittance is at least 85%. (v) The b* value in the L*a*b* color system is 5 or less. (vi) The tensile elongation is at least 10%.

14 Claims, 2 Drawing Sheets

POLYAMIC ACID, VARNISH CONTAINING SAME, FILM, TOUCH PANEL DISPLAY, LIQUID CRYSTAL DISPLAY, AND ORGANIC EL DISPLAY

TECHNICAL FIELD

The present invention relates to a polyamic acid, a varnish including the polyamic acid, a film, and a touch panel display, a liquid crystal display, and an organic EL display each including the film.

BACKGROUND ART

Conventionally, in displays such as liquid crystal display elements and organic EL display elements, inorganic glass, which is a transparent material, has been used for panel substrates and the like. However, inorganic glass has a high specific gravity (weight) and, in addition, low flexibility and low shock resistance. In view of this, the use of polyimide films, which are excellent in lightweight properties, shock resistance, processability, and flexibility, as panel substrates of display apparatuses has been studied.

Here, a panel substrate of a display apparatus is required to have high light transmittance. In the display apparatus, an image displayed by an element is observed through the panel substrate. Thus, the panel substrate is also required to have a small retardation in the direction of travel of light (the thickness direction of the substrate). The panel substrate may be subjected to heat in forming the element on the panel substrate. Thus, the panel substrate is also required to have high thermal stability and high dimensional stability (e.g., to have a low coefficient of thermal expansion).

In the related art, it has been proposed that the coefficient of thermal expansion and the thickness-direction retardation of a polyimide film are reduced by using a polyimide having a naphthalene structure and a fluorene structure (PTL 1). It has also been proposed that a polyimide film having low water absorbing properties is obtained by using a polyimide obtained from fluorenylidene bisphthalic anhydride and diamine (PTL 2).

Furthermore, it has also been proposed that a polyimide film having high gas permeability, high thermal stability, and high mechanical strength is obtained by using a polyimide obtained from 9,9-bis(4-aminophenyl)fluorene and tetracarboxylic dianhydride (PTL 3). It has also been proposed that a polyimide film having, for example, high transparency, high thermal stability, and a low coefficient of thermal expansion is obtained by mixing a polyamic acid with a compound including an alkali metal or an alkaline-earth metal and imidizing the resulting mixture (PTL 4).

CITATION LIST

Patent Literature

PTL 1
WO 2014/162734
PTL 2
Japanese Patent Application Laid-Open No. 2009-79165
PTL 3
Japanese Patent Application Laid-Open No. HEI 5-31341
PTL 4
WO 2009/069688

SUMMARY OF INVENTION

Technical Problem

In recent years, the use of a polyimide film as a substrate for a TFT array has been studied. A TFT array is produced through a process using a polycrystalline low-temperature polysilicon (LTPS). Thus, the polyimide film used as a substrate for a TFT array is required to have, for example, thermal stability, bending strength, and flexibility higher than those in the related art. However, none of the polyimide films in the above literatures are sufficient in these properties, and it has been required to increase the thermal stability and the bending strength and further improve the flexibility while reducing the thickness-direction retardation and the coefficient of thermal expansion.

The present invention has been made under these circumstances, and an object thereof is to provide a film having high thermal stability, high bending strength (tensile elongation), a small thickness-direction retardation, a low coefficient of thermal expansion, and, furthermore, high transparency, and a polyamic acid and a varnish for obtaining the film. Another object of the present invention is to provide a touch panel display, a liquid crystal display, and an organic EL display each including the film.

Solution to Problem

More specifically, the present invention provides the following film.

A polymer film that satisfies all requirements (i) to (vi):
(i) to have an average coefficient of thermal expansion in a range of 100° C. to 200° C. of 35 ppm/K or less;
(ii) to have a thickness-direction retardation whose absolute value is 200 nm or less per 10 μm thickness;
(iii) to have a glass transition temperature of 340° C. or higher;
(iv) to have a total light transmittance of 85% or more;
(v) to have a b* value in the L*a*b* color system of 5 or less; and
(vi) to have a tensile elongation of 10% or more.

[2] The polymer film according to [1], comprising a polyimide that is a polymer of a diamine component and a tetracarboxylic dianhydride component.

[3] The polymer film according to [2], wherein
the diamine component includes t-diaminocyclohexane, and
the tetracarboxylic dianhydride component includes
a tetracarboxylic dianhydride A represented by general formula (a) or general formula (b):

[General Formula 1]

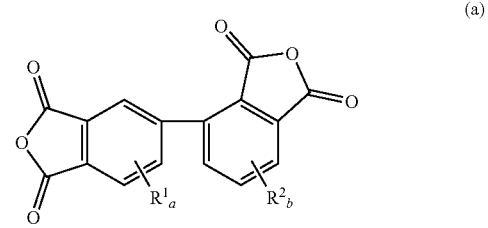

-continued

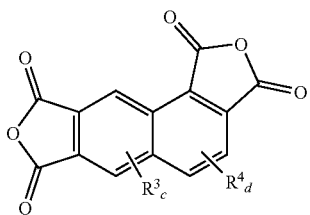
(b)

wherein, in general formulae (a) and (b), $R^1$, $R^2$, $R^3$, and $R^4$ each independently represent an alkyl group having 1 to 4 carbon atoms, and a, b, c, and d each represent an integer of 0 to 3 (provided that a+b is 3 or less, and c+d is 3 or less), a tetracarboxylic dianhydride B represented by general formula (c) or general formula (d):

[General Formula 2]

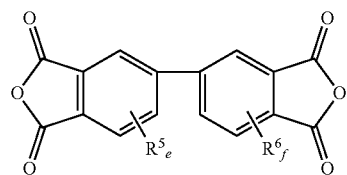
(c)

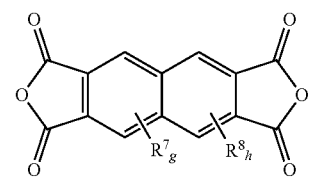
(d)

wherein, in general formulae (c) and (d), $R^5$, $R^6$, $R^7$, and $R^8$ each independently represent an alkyl group having 1 to 4 carbon atoms, and e, f, g, and h each represent an integer of 0 to 3 (provided that e+f is 3 or less, and g+h is 3 or less), and a tetracarboxylic dianhydride C represented by general formula (e):

[General Formula 3]

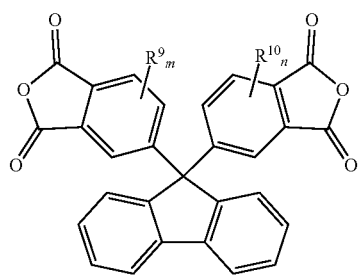
(e)

wherein, in general formula (e), $R^9$ and $R^{10}$ each independently represent an alkyl group having 1 to 4 carbon atoms, and m and n each represent an integer of 0 to 3 (provided that m+n is 3 or less).

[4] The polymer film according to [3], wherein
the diamine component further includes at least one of 1,4-diaminomethylcyclohexane and 9,9-bis(4-aminophenyl)fluorene.

[5] The polymer film according to [3] or [4], wherein
t-diaminocyclohexane is included in an amount of 55 mol % to 100 mol % based on the total amount of the diamine component, and
the tetracarboxylic dianhydride A, the tetracarboxylic dianhydride B, and the tetracarboxylic dianhydride C are included in amounts of 2 mol % to 50 mol %, 30 mol % to 80 mol %, and 2 mol % to 50 mol %, respectively, based on the total amount of the tetracarboxylic dianhydride.

The present invention provides the following polyamic acid.

[6] A polyamic acid that is a polymer of a diamine component and a tetracarboxylic dianhydride component, wherein a polyimide film obtained by imidizing the polyamic acid satisfies all requirements (i) to (vi):

(i) to have an average coefficient of thermal expansion in a range of 100° C. to 200° C. of 35 ppm/K or less;

(ii) to have a thickness-direction retardation whose absolute value is 200 nm or less per 10 μm thickness;

(iii) to have a glass transition temperature of 340° C. or higher;

(iv) to have a total light transmittance of 85% or more;

(v) to have a b* value in the L*a*b* color system of 5 or less; and (vi) to have a tensile elongation of 10% or more.

[7] The polyamic acid according to [6], wherein
the diamine component includes t-diaminocyclohexane, and
the tetracarboxylic dianhydride component includes
a tetracarboxylic dianhydride A represented by general formula (a) or general formula (b):

[General Formula 4]

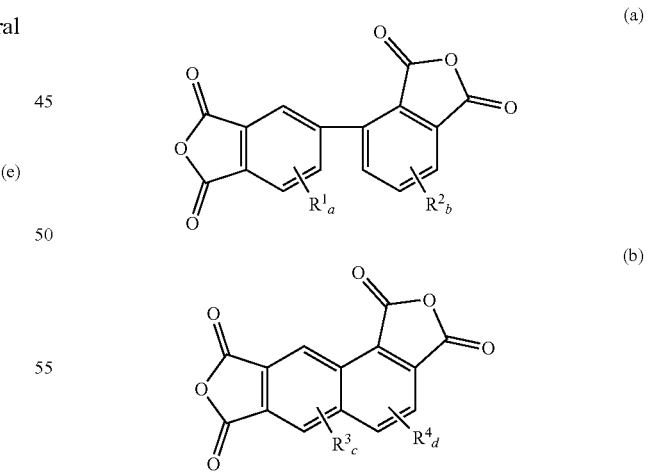

wherein, in general formulae (a) and (b), $R^1$, $R^2$, $R^3$, and $R^4$ each independently represent an alkyl group having 1 to 4 carbon atoms, and a, b, c, and d each represent an integer of 0 to 3 (provided that a+b is 3 or less, and c+d is 3 or less),
a tetracarboxylic dianhydride B represented by general formula (c) or general formula (d):

[General Formula 5]

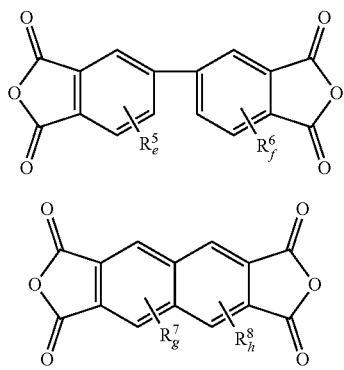

(c)

(d)

wherein, in general formulae (c) and (d), $R^5$, $R^6$, $R^7$, and $R^8$ each independently represent an alkyl group having 1 to 4 carbon atoms, and e, f, g, and h each represent an integer of 0 to 3 (provided that e+f is 3 or less, and g+h is 3 or less), and a tetracarboxylic dianhydride C represented by general formula (e):

[General Formula 6]

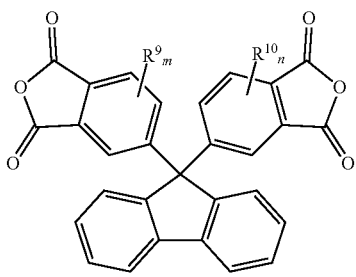

(e)

wherein, in general formula (e), $R^9$ and $R^{10}$ each independently represent an alkyl group having 1 to 4 carbon atoms, and m and n each represent an integer of 0 to 3 (provided that m+n is 3 or less).

[8] The polyamic acid according to [7], wherein the diamine component further includes at least one of 1,4-diaminomethylcyclohexane and 9,9-bis(4-aminophenyl) fluorene.

[9] The polyamic acid according to [7] or [8], wherein t-diaminocyclohexane is included in an amount of 55 mol % to 100 mol % based on the total amount of the diamine component, and the tetracarboxylic dianhydride A, the tetracarboxylic dianhydride B, and the tetracarboxylic dianhydride C are included in amounts of 2 mol % to 50 mol %, 30 mol % to 80 mol %, and 2 mol % to 50 mol %, respectively, based on the total amount of the tetracarboxylic dianhydride.

[10] A polyamic acid varnish comprising the polyamic acid according to any one of [6] to [9].

The present invention provides the following method for producing a polyimide multilayer, method for producing a polyimide film, and variety of displays.

[11] A method for producing a polyimide multilayer including a stack of a substrate and a polyimide layer, the method comprising:

applying the polyamic acid varnish according to [10] onto a substrate; and heating a coating of the polyamic acid varnish in an inert gas atmosphere to cause imidization.

[12] A method for producing a polyimide multilayer including a stack of a substrate and a polyimide layer, the method comprising:

applying the polyamic acid varnish according to [10] onto a substrate; and heating a coating of the polyamic acid varnish in an atmosphere at 15 kPa or less to cause imidization.

[13] A method for producing a polyimide film, comprising peeling off a substrate from a polyimide multilayer obtained by the method for producing a polyimide multilayer according to [11].

[14] A method for producing a polyimide film, comprising peeling off a substrate from a polyimide multilayer obtained by the method for producing a polyimide multilayer according to [12].

[15] A touch panel display comprising the polymer film according to [1].

[16] A liquid crystal display comprising the polymer film according to [1].

[17] An organic EL display comprising the polymer film according to [1].

Advantageous Effects of Invention

The film of the present invention has high thermal stability and a high tensile elongation. In addition, the film has a small thickness-direction retardation and a low coefficient of thermal expansion. Furthermore, the film has high visible light transmittance and is less likely to be colored. Thus, the film can be used as a panel substrate for various display apparatuses.

DESCRIPTION OF EMBODIMENTS

Figure 1:
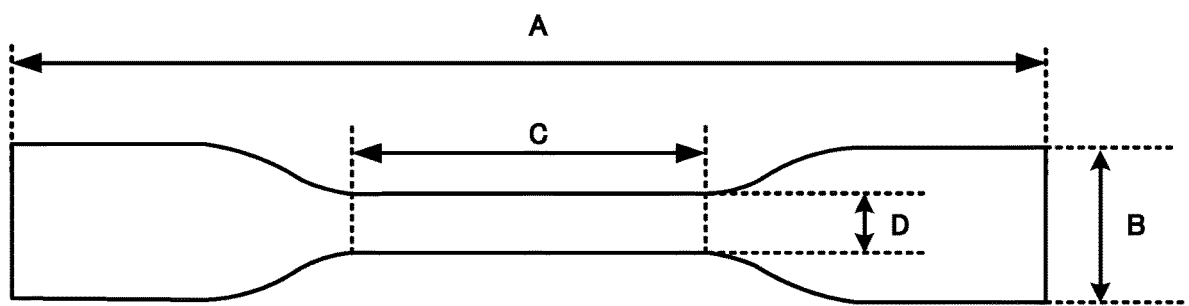
FIG. 1 is a plan view illustrating the shape of a test piece for measuring tensile elongation.

1. Regarding Film (1) Physical Properties of Film

As described above, in the related art, a film having a combination of sufficient thermal stability, high bending strength, and high flexibility, having a small thickness-direction retardation and a low coefficient of thermal expansion, and also having high transparency has actually not been obtained. In contrast, the film of the present invention satisfies all requirements (i) to (vi) below. Thus, the film is very useful, for example, as a panel substrate for various display apparatuses.

(i) To have an average coefficient of thermal expansion in the range of 100° C. to 200° C. of 35 ppm/K or less.

(ii) To have a thickness-direction retardation whose absolute value is 200 nm or less per 10 μm thickness.

(iii) To have a glass transition temperature of 340° C. or higher.
(iv) To have a total light transmittance of 85% or more.
(v) To have a b* value in the L*a*b* color system of 5 or less.
(vi) To have a tensile elongation of 10% or more.

The requirements will be described below in detail.

(i) Coefficient of Thermal Expansion

The film of the present invention has an average coefficient of thermal expansion in the range of 100° C. to 200° C. of 35 ppm/K or less, preferably 30 ppm/K or less, more preferably 28 ppm/K or less. The average coefficient of thermal expansion is typically 7 ppm/K or more. When the average coefficient of thermal expansion in the above temperature range is low (35 ppm/K or less), the film is unlikely to undergo deformation when an element is formed on the film. When a display apparatus is manufactured, an element may be formed on a film with the film being fixed onto a substrate made of an inorganic material. At this time, if the difference between the coefficient of thermal expansion of the film and the coefficient of thermal expansion of the substrate is large, a difference in stress is produced between the film and the substrate, and the substrate and the multilayer (the stack of the film and the element) are likely to warp. In contrast, if the coefficient of thermal expansion is within the above range, such warp is unlikely to occur, and a high-quality display apparatus can be obtained.

Here, the coefficient of thermal expansion of the film is adjusted, for example, by the choice of the type of diamine component or tetracarboxylic dianhydride component for preparing a polyimide described below. In particular, when the diamine component includes at least a certain amount of t-diaminocyclohexane, the coefficient of thermal expansion tends to be low. The coefficient of thermal expansion is measured with a thermomechanical analyzer (TMA). More specifically, the temperature of the film is raised from 100° C. to 200° C. at a heating rate of 5° C./min, and a coefficient of thermal expansion is plotted every second (i.e., at 0.083° C. intervals). The average value of coefficient of thermal expansions plotted in the range of 100° C. to 200° C. is employed as the average coefficient of thermal expansion in the range of 100° C. to 200° C.

(ii) Thickness-Direction Retardation (Rth)

The absolute value of the thickness-direction retardation (hereinafter also referred to as "Rth") of the film of the present invention is 200 nm or less per 10 μm thickness, preferably 180 nm or less, more preferably 150 nm or less. Although the absolute value of Rth per 10 μm thickness is preferably smaller, when the above-described expansion coefficient is 30 ppm/K or less, the absolute value of Rth per 10 μm thickness is typically 80 nm or more, preferably 100 nm or more. When the absolute value of Rth per 10 μm thickness is 200 nm or less, an image observed through the film is unlikely to look distorted or blurred, which is very useful for optical applications. The Rth of the film is adjusted, for example, by the choice of the type of diamine component or tetracarboxylic dianhydride component for preparing a polyimide described below. In particular, when the tetracarboxylic dianhydride component includes a certain amount of tetracarboxylic dianhydride C (e.g., fluorenylidene bisphthalic anhydride) described below and tetracarboxylic dianhydride A (e.g., 2,3,3',4'-biphenyltetracarboxylic dianhydride) described below, the absolute value of Rth tends to be small.

The absolute value of Rth is calculated as described below. Using an optical material inspection apparatus (RETS-100 model) manufactured by Otsuka Electronics Co., Ltd., the film is irradiated with light with a wavelength of 550 nm at room temperature (20° C. to 25° C.), and a refractive index nx in the X-axis direction, a refractive index ny in the Y-axis direction, and a refractive index nz in the Z-axis direction are measured. On the basis of these measured values and a thickness d of the film, the absolute value of Rth is calculated by the following expression.

$$\text{Absolute value of } Rth \text{ (nm)} = |[nz-(nx+ny)/2] \times d|$$

If necessary, the calculated value is converted into a value per 10 μm thickness of the film.

(iii) Glass Transition Temperature

The glass transition temperature (Tg) of the film of the present invention is 340° C. or higher, preferably 350° C. or higher, more preferably 350° C. to 370° C. When the glass transition temperature of the film is 340° C. or higher, the film can be used also as, for example, a substrate for a TFT array. More specifically, although TFT array production using low-temperature polysilicon requires an operation at about 350° C., if the glass transition temperature is 340° C. or higher, the film can be used in such an operation environment, and a highly reliable display apparatus is readily obtained.

The glass transition temperature of the film is adjusted, for example, by the choice of the equivalent weight of imide groups included in a polyimide described below or the structure of a diamine component or a tetracarboxylic dianhydride component for preparing the polyimide. In particular, when the tetracarboxylic dianhydride component includes a tetracarboxylic dianhydride A (e.g., 2,3,3',4'-biphenyltetracarboxylic dianhydride) and a tetracarboxylic dianhydride C (e.g., fluorenylidene bisphthalic anhydride) described below each in a certain amount, or when the diamine component includes a certain amount of 9,9-bis(4-aminophenyl)fluorene, the glass transition temperature (Tg) of the polyimide film tends to be high. The glass transition temperature is measured with a thermomechanical analyzer (TMA).

(iv) Total Light Transmittance

The film of the present invention has a total light transmittance of 85% or more, preferably 87% or more, more preferably 89% or more. Although the total light transmittance is preferably 100%, the upper limit is typically 92%, preferably about 90%. A film having such a high total light transmittance is suitable, for example, for an optical film, that is, a substrate for various display apparatuses.

The transmittance of the film is adjusted, for example, by the choice of the amount of polymerization unit (imide group) of diamine and aromatic tetracarboxylic dianhydride included in a polyimide described below and the conditions for polyimide production (conditions for imidization of polyamic acid). The total light transmittance can be increased also by the choice of the type of tetracarboxylic dianhydride component and diamine component for preparing a polyimide. For example, when a compound having a cyclohexane skeleton (e.g., t-diaminocyclohexane or 1,4-diaminomethylcyclohexane) is included as a diamine component, the total light transmittance tends to be high.

The total light transmittance of the film is measured with a light source D65 in accordance with JIS-K 7361-1. The thickness of the film at the time of measuring the total light transmittance is not particularly limited, and the total light transmittance of an actually produced film (i.e., a film having a thickness at the time of use) is measured.

(v) b* Value in L*a*b* Color System

The film of the present invention has a b* value in the L*a*b* color system of 5 or less, preferably 3.5 or less, more preferably 2.0 or less. The b* value in the L*a*b* color system represents the yellowness of a film, and smaller values indicate lower yellowness. Thus, the lower limit is ideally 0, but when the film includes a polyimide, the lower limit is typically about 1.0. Here, when a film having a b* value of 5 or less is used, for example, as a substrate for various display apparatuses, the substrate has good transparency. In other words, such a film is suitable, for example, for an optical film, that is, a substrate for various display apparatuses. The b* value can be decreased, for example, by the choice of the type of tetracarboxylic dianhydride component and diamine component for preparing a polyimide described below. For example, when a compound having a cyclohexane skeleton (e.g., t-diaminocyclohexane or 1,4-diaminomethylcyclohexane) is included as a diamine component, the b* value tends to be small.

The b* value is a value of the film measured in a transparent mode using a colorimeter (e.g., a direct-reading tristimulus colorimeter (Colour Cute iCC-i model) manufactured by Suga Test Instruments Co., Ltd.). The thickness of the film at the time of measuring the b* value is not particularly limited, and the b* value of an actually produced film (i.e., a film having a thickness at the time of use) is measured.

(vi) Tensile Elongation

The film of the present invention has a tensile elongation of 10% or more, preferably 11% or more, more preferably 13% or more. The tensile elongation is typically 20% or less. The tensile elongation of the film is the degree of elongation of the film subjected to a tensile test, that is, an indicator of bending strength and flexibility of the film. When a display apparatus is manufactured, an element may be formed on a film with the film being fixed onto a substrate made of an inorganic material, as described above. In this case, the film needs to be peeled off the substrate after the formation of the element, and if the tensile elongation of the film is 10% or more at this time, the device is less likely to break when the film is peeled off the substrate. The tensile elongation can be increased, for example, by the choice of the type of tetracarboxylic dianhydride component and diamine component for preparing a polyimide described below. For example, when the tetracarboxylic dianhydride component includes a tetracarboxylic dianhydride A (e.g., 2,3,3',4'-biphenyltetracarboxylic dianhydride) described below, the tensile elongation tends to be high.

The tensile test can be carried out using a tensile tester (e.g., Shimadzu compact table-top tester EZ-S). Specifically, a sample having a shape shown in FIG. 1 is prepared and measured under the following conditions. The thickness of the film at the time of measuring the tensile elongation is not particularly limited, and the tensile elongation of an actually produced film (i.e., a polyimide film having a thickness at the time of use) is measured.

(Test Conditions)
Length of A in FIG. 1: 50 mm
Length of B in FIG. 1: 10 mm
Length of C in FIG. 1: 20 mm
Length of D in FIG. 1: 5 mm
Measurement environment: 23° C. and 50% Rh
Chuck distance: 30 mm
Tensile speed: 30 mm/min The tensile elongation is calculated by the following expression.

Tensile elongation={(film length at break in tensile test−film length before tensile test)/film length before tensile test}×100

(vii) Thickness

The thickness of the film of the present invention is not particularly limited and is appropriately selected depending on, for example, the use for the film. When the film includes a polyimide, that is, in the case of a polyimide film, the thickness is typically 1 to 100 μm, preferably 5 to 50 μm, more preferably 5 to 30 μm.

(2) Regarding Material of Film

The above-described film may be made of any material as long as the above requirements (i) to (vi) are satisfied. For example, a film including a polyimide, a film including a heat-resistant polyamide and a metal, or the like may be employed. In particular, a film including a polyimide is preferred, for example, in view of thermal stability. The polyimide will be described below in detail.

(2-1) Regarding Polyimide

The film (polyimide film) having the above-described physical properties and including a polyimide preferably includes a specific polyimide composed of a polymer of a specific diamine component and a specific tetracarboxylic dianhydride. The polyimide film may include a component other than the specific polyimide as long as the objects and advantageous effects of the present invention are not impaired. The amount of the specific polyimide based on the total amount of the polyimide film is preferably 80 mass % or more, more preferably 90 mass % or more. Still more preferably, substantially all are composed of the specific polyimide.

The specific polyimide will be described below in detail.

(Diamine Component)

The diamine component for preparing the specific polyimide includes at least t(trans)-diaminocyclohexane. When the diamine component includes a certain amount of t-diaminocyclohexane, the polyimide film has (i) a low coefficient of thermal expansion, (iv) a high total light transmittance, and (v) a small b* value in the L*a*b* color system. The content of t-diaminocyclohexane based on the total amount of the diamine component is preferably 55 mol % to 100 mol %, more preferably 60 mol % to 100 mol %, still more preferably 80 mol % to 100 mol %, particularly preferably 85 mol % to 100 mol %, further more preferably 90 mol % to 100 mol %.

Preferably, the diamine component further includes at least one of 1,4-diaminomethylcyclohexane and 9,9-bis(4-aminophenyl)fluorene.

The content of 1,4-diaminomethylcyclohexane based on the total amount of the diamine component is preferably 0 mol % to 20 mol %, more preferably 0 mol % to 10 mol %. When the diamine component includes 1,4-diaminomethylcyclohexane in an amount of 20 mol % or less, the polyimide film tends to have (ii) a thickness-direction retardation whose absolute value is small, (iv) a high total light transmittance, and (v) a small b* value in the L*a*b* color system.

The content of 9,9-bis(4-aminophenyl)fluorene based on the total amount of the diamine component is preferably 0 mol % or more and less than 30 mol %, more preferably 0 mol % to 20 mol %, still more preferably 0 mol % to 10 mol %. When the diamine component includes 9,9-bis(4-aminophenyl)fluorene in an amount of 30 mol % or less, the polyimide film tends to have (ii) a thickness-direction retardation whose absolute value is small and (iii) a high glass transition temperature. The phenyl group of 9,9-bis(4-aminophenyl)fluorene may have one or more alkyl groups (substituents) having 4 or less carbon atoms. The total number of substituents of 9,9-bis(4-aminophenyl)fluorene is preferably 3 or less. The number of carbon atoms of the alkyl group is preferably 1 or 2. That is, the substituent is preferably a methyl group or an ethyl group.

The diamine component may include a component other than t-diaminocyclohexane, 1,4-diaminomethylcyclohexane, and 9,9-bis(4-aminophenyl)fluorene described above, as long as the objects and advantageous effects of the present invention are not impaired.

Examples of other diamines include various known diamines. Specific examples include diamines having an aromatic ring, diamines having a spirobiindane ring, siloxane diamines, ethylene glycol diamines, alkylene diamines, and alicyclic diamines.

(Tetracarboxylic Dianhydride Component)

The tetracarboxylic dianhydride component for preparing the specific polyimide includes a tetracarboxylic dianhydride A represented by general formula (a) or (b) below, a tetracarboxylic dianhydride B represented by general formula (c) or (d) below, and a tetracarboxylic dianhydride C represented by general formula (e) below.

[General Formula 7]

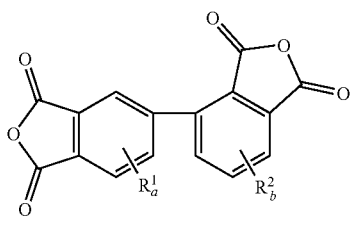

(a)

(b)

In general formulae (a) and (b), $R^1$, $R^2$, $R^3$, and $R^4$ each independently represent an alkyl group having 1 to 4 carbon atoms. The number of carbon atoms of the alkyl group in preferably 1 or 2. a, b, c, and d each represent an integer of 0 to 3, provided that a+b is 3 or less, and c+d is 3 or less.

[General Formula 8]

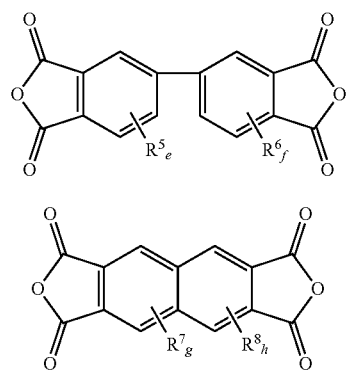

(c)

(d)

In general formulae (c) and (d), $R^5$, $R^6$, $R^7$, and $R^8$ each independently represent an alkyl group having 1 to 4 carbon atoms. The number of carbon atoms of the alkyl group in preferably 1 or 2. e, f, g, and h each represent an integer of 0 to 3, provided that e+f is 3 or less, and g+h is 3 or less.

[General Formula 9]

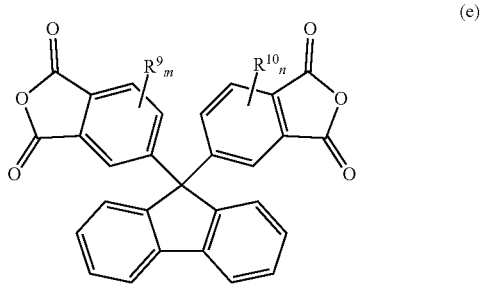

(e)

In general formula (e), $R^9$ and $R^{10}$ each independently represent an alkyl group having 1 to 4 carbon atoms, and the number of carbon atoms of the alkyl group is preferably 1 or 2. m and n each represent an integer of 0 to 3, provided that m+n is 3 or less.

In particular, the tetracarboxylic dianhydride preferably includes at least 2,3,3',4'-biphenyltetracarboxylic dianhydride, 3,3',4,4'-biphenyltetracarboxylic dianhydride, and fluorenylidene bisphthalic anhydride.

When the tetracarboxylic dianhydride component includes a tetracarboxylic dianhydride A (e.g., 2,3,3',4'-biphenyltetracarboxylic dianhydride), the polyimide film tends to have (ii) a thickness-direction retardation whose absolute value is small, (iii) a high glass transition temperature, and (vi) a high tensile elongation. The content of the tetracarboxylic dianhydride A (e.g., 2,3,3',4'-biphenyltetracarboxylic dianhydride) based on the total amount of the tetracarboxylic dianhydride component is preferably 2 mol % to 50 mol %, more preferably 5 mol % to 45 mol %, still more preferably 10 mol % to 40 mol %, particularly preferably 10 mol % to 25 mol %, further more preferably 10 mol % to 20 mol %. When the content of the tetracarboxylic dianhydride A (e.g., 2,3,3',4'-biphenyltetracarboxylic dianhydride) is particularly 10 mol % or more, the polyimide film tends to have a thickness-direction retardation whose absolute value is small and (vi) a high tensile elongation. On the other hand, when the content of the tetracarboxylic dianhydride A (e.g., 2,3,3',4'-biphenyltetracarboxylic dianhydride) is particularly 40 mol % or less, the amount of the tetracarboxylic dianhydride B (e.g., 3,3',4,4'-biphenyltetracarboxylic dianhydride) and the tetracarboxylic dianhydride C (e.g., fluorenylidene bisphthalic anhydride) relatively becomes sufficient, and the polyimide film has (i) a low coefficient of thermal expansion and high thermal stability.

When the tetracarboxylic dianhydride component includes a tetracarboxylic dianhydride B (e.g., 3,3',4,4'-biphenyltetracarboxylic dianhydride), the polyimide film has (i) a low coefficient of thermal expansion. The content of the tetracarboxylic dianhydride B (e.g., 3,3',4,4'-biphenyltetracarboxylic dianhydride) based on the amount of the tetracarboxylic dianhydride component is preferably 30 mol % to 80 mol %, more preferably 35 mol % to 75 mol %, still more preferably 40 mol % to 70 mol %, particularly preferably 50 mol % to 65 mol %. When the amount of the tetracarboxylic dianhydride B (e.g., 3,3',4,4'-biphenyltetracarboxylic dianhydride) is particularly 40 mol % or more, the polyimide film has (i) a low coefficient of thermal expansion. On the other hand, when the amount of the tetracarboxylic dianhydride B (e.g., 3,3',4,4'-biphenyltetracarboxylic dianhydride) is particularly 70 mol % or less, the amount of the tetracarboxylic dianhydride A (e.g., 2,3,3',4'-biphenyltetracarboxylic dianhydride) and the tetracarboxylic dianhydride C (e.g., fluorenylidene bisphthalic anhydride) relatively becomes sufficient, and the polyimide film has a thickness-direction retardation whose absolute value is small, (vi) a high tensile elongation, and high thermal stability.

Furthermore, when the tetracarboxylic dianhydride component includes a tetracarboxylic dianhydride C (e.g., fluorenylidene bisphthalic anhydride), the polyimide film tends to have (ii) a thickness-direction retardation whose absolute value is small and (iii) a high glass transition temperature. The content of the tetracarboxylic dianhydride C (e.g., fluorenylidene bisphthalic anhydride) based on the total amount of the tetracarboxylic dianhydride component is preferably 2 mol % to 50 mol %, more preferably 5 mol % to 45 mol %, still more preferably 10 mol % to 40 mol %, particularly preferably 20 mol % to 40 mol %. When the amount of the tetracarboxylic dianhydride C (e.g., fluorenylidene bisphthalic anhydride) is 10 mol % or more, the polyimide film tends to have a thickness-direction retardation whose absolute value is small and a high glass transition temperature. On the other hand, when the amount of the tetracarboxylic dianhydride C (e.g., fluorenylidene bisphthalic anhydride) is 40 mol % or less, the amount of the tetracarboxylic dianhydride A (e.g., 2,3,3',4'-biphenyltetracarboxylic dianhydride) and the tetracarboxylic dianhydride B (e.g., 3,3',4,4'-biphenyltetracarboxylic dianhydride) relatively becomes sufficient, and the polyimide film has (i) a low coefficient of thermal expansion and (vi) a high tensile elongation.

One preferred combination of tetracarboxylic dianhydrides includes 10 mol % to 40 mol % of 2,3,3',4'-biphenyltetracarboxylic dianhydride, 40 mol % to 70 mol % of 3,3',4,4'-biphenyltetracarboxylic dianhydride, and 10 mol % to 40 mol % of fluorenylidene bisphthalic anhydride, the percentages being based on the total amount of the tetracarboxylic dianhydrides.

The tetracarboxylic dianhydride component may include a component other than the tetracarboxylic dianhydride A (e.g., 2,3,3',4'-biphenyltetracarboxylic dianhydride), the tetracarboxylic dianhydride B (e.g., 3,3',4,4'-biphenyltetracarboxylic dianhydride), and the tetracarboxylic dianhydride C (e.g., fluorenylidene bisphthalic anhydride) described above, as long as the objects and advantageous effects of the present invention are not impaired.

Examples of other tetracarboxylic dianhydrides include known tetracarboxylic dianhydrides, specifically, optionally substituted aromatic tetracarboxylic dianhydrides and alicyclic tetracarboxylic dianhydrides.

The specific polyimide may partially include a trianhydride or a tetraanhydride instead of the above tetracarboxylic dianhydride component. Examples of acid trianhydrides include hexacarboxylic trianhydrides, and examples of acid tetraanhydrides include octacarboxylic tetraanhydrides.

(2-2) Regarding Method for Producing Polyimide Film

The specific polyimide is obtained by polymerizing the diamine component and the tetracarboxylic dianhydride component described above by a known method. The polyimide may be a random polymer or a block copolymer. If the polyimide includes a polymerization unit of an aromatic diamine and an aromatic tetracarboxylic dianhydride (imide group) in a large amount, the polyimide film may be readily colored, leading to a reduction in total light transmittance. Thus, when the polyimide is a random polymer, the ratio of the total amount (mole) of the aromatic diamine and the aromatic tetracarboxylic dianhydride relative to the total amount (mole) of the diamine component and the tetracarboxylic dianhydride component is preferably low. Specifically, the ratio is preferably 0 mol % or more and less than 30 mol %, more preferably 0 mol % to 20 mol %, still more preferably 0 mol % to 10 mol %.

The polyimide film of the present invention is obtained by 1) polymerizing the diamine component and the tetracarboxylic dianhydride component described above to prepare a polyamic acid, 2) applying a varnish including the polyamic acid to a substrate to form a coating, and 3) imidizing (cyclizing) the polyamic acid in the coating.

In the case where the polyimide is a block copolymer, the polyimide film of the present invention is obtained by 1) reacting a polyamic acid oligomer and a polyimide oligomer to prepare a block polyamic acid imide, 2) applying a varnish including the block polyamic acid imide to a substrate to form a coating, and 3) imidizing (cyclizing) the block polyamic acid imide in the coating.

(Preparation of Polyamic Acid or Block Polyamic Acid Imide)

When the polyimide to be prepared is a random polymer, the tetracarboxylic dianhydride component and the diamine component described above are polymerized by mixing them together to obtain a polyamic acid. Here, the ratio of the total molar amount y of the tetracarboxylic dianhydride component to the total molar amount x of the diamine component (y/x) in preparing the polyamic acid is preferably 0.9 to 1.1, more preferably 0.95 to 1.05, still more preferably 0.97 to 1.03, particularly preferably 0.99 to 1.01.

The diamine component and the tetracarboxylic dianhydride component may be polymerized by any method, and a known method can be used. For example, a container equipped with a stirrer and a nitrogen inlet tube is provided, and a solvent is placed in the container purged with nitrogen. The diamine component is then added such that the final polyamic acid will have a solids concentration of 50 mass % or less, and the resulting mixture is stirred at a controlled temperature. A predetermined amount of tetracarboxylic dianhydride is added to the solution. The resulting solution is then stirred for about 1 to 50 hours while controlling the temperature.

Here, the solvent used in preparing the polyamic acid is not particularly limited as long as it can dissolve the diamine component and the tetracarboxylic dianhydride component described above. For example, an aprotic polar solvent and/or a water-soluble alcohol solvent may be employed.

Examples of aprotic polar solvents include N-methyl-2-pyrrolidone, N,N-dimethylformamide, N,N-dimethylacetamide, dimethylsulfoxide, hexamethylphosphoramide, 1,3-dimethyl-2-imidazolidinone; ether compounds such as 2-methoxyethanol, 2-ethoxyethanol, 2-(methoxymethoxy) ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol, tetrahydrofuran, dioxane, 1,2-dimethoxyethane, diethylene glycol dimethyl ether, and diethylene glycol diethyl ether.

Examples of water-soluble alcohol solvents include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetone alcohol.

The solvent used in preparing the polyamic acid may include one or more of the above components. Among the above components, N,N-dimethylacetamide, N-methyl-2-pyrrolidone, or a mixed solution thereof is preferred.

When the polyimide to be prepared is a block polymer, a specific diamine component and a specific tetracarboxylic dianhydride component are each polymerized to preliminarily prepare a polyamic acid oligomer terminated with amines and a polyimide oligomer terminated with acid anhydrides. Then, a solution of the polyimide oligomer terminated with acid anhydrides is added to a solution of the polyamic acid oligomer terminated with amines, and the resulting solution is stirred to polymerize them, thereby obtaining a block polyamic acid imide.

(Application of Varnish)

A varnish including the polyamic acid (or the block polyamic acid imide) described above and a solvent is applied to a surface of a substrate to form a coating. The solvent included in the varnish may be the same as or different from the solvent used in the preparation of the polyamic acid described above. The varnish may include one or more solvents.

The amount of the polyamic acid (or the block polyamic acid imide) based on the total amount of the varnish is preferably 1 mass % to 50 mass %, more preferably 10 mass % to 45 mass %. If the amount of the polyamic acid (or the block polyamic acid imide) is more than 50 mass %, the varnish may be excessively viscous and difficult to apply to the substrate. If the concentration of the polyamic acid (or the block polyamic acid imide) is less than 1 mass %, the viscosity of the varnish may be excessively low, so that the varnish cannot be applied so as to have a desired thickness. In addition, it takes time to dry the solvent, resulting in poor efficiency in production of the polyimide film.

The substrate to which the varnish is applied is not particularly limited as long as it has solvent resistance and thermal stability. The substrate is preferably a substrate from which the resulting polyimide layer can be successfully peeled off, and is preferably glass or a flexible substrate made of, for example, metal or a heat-resistant polymer film. Examples of the flexible substrate made of metal include metal foils made of copper, aluminum, stainless steel, iron, silver, palladium, nickel, chromium, molybdenum, tungsten, zirconium, gold, cobalt, titanium, tantalum, zinc, lead, tin, silicon, bismuth, indium, and alloys thereof. The surface of such a metal foil may be coated with a release agent.

Examples of the flexible substrate made of a heat-resistant polymer film includes polyimide films, aramid films, polyether ether ketone films, and polyether ether sulfone films. The flexible substrate made of a heat-resistant polymer film may include a release agent or an antistatic agent, or may have, on its surface, a coating of a release agent or an antistatic agent. In view of good peelability of the resulting polyimide film, high thermal stability, and high solvent resistance, the substrate is preferably a polyimide film.

The shape of the substrate is appropriately selected according to the shape of a polyimide film to be produced, and may be a single-sheet shape or an elongated shape. The thickness of the substrate is preferably 5 to 150 μm, more preferably 10 to 70 μm. If the thickness of the substrate is less than 5 μm, the substrate may be wrinkled or torn during the application of the varnish.

The method of applying the varnish to the substrate is not particularly limited as long as the varnish can be applied so as to have a uniform thickness. Examples of coaters include die coaters, comma coaters, roll coaters, gravure coaters, curtain coaters, spray coaters, and lip coaters. The thickness of the coating to be formed is appropriately selected depending on the thickness of a desired polyimide film.

(Imidization of Polyamic Acid (or Block Polyamic Acid Imide))

Subsequently, the coating of the varnish including the polyamic acid (or the block polyamic acid imide) is heated to imidize (cyclize) the polyamic acid (or the block polyamic acid imide). Specifically, the coating of the varnish described above is heated while increasing the temperature from 150° C. or lower to higher than 200° C. to imidize the polyamic acid (or the block polyamic acid imide). In this process, the solvent in the coating is removed. After the temperature is raised to a predetermined temperature, heating is performed at the temperature for a certain period of time.

In general, the temperature at which polyamic acids and the like are imidized is 150° C. to 200° C. Therefore, if the temperature of the coating is rapidly raised to 200° C. or higher, the polyamic acid on the coating surface is imidized before the solvent is volatilized from the coating. Consequently, the solvent remaining in the coating forms bubbles, or irregularities are formed on the coating surface. Thus, the temperature of the coating is preferably raised in a gradual manner in the temperature range of 150° C. to 200° C. Specifically, the heating rate in the temperature range of 150° C. to 200° C. is preferably 0.25° C./min to 50° C./min, more preferably 1° C./min to 40° C./min, still more preferably 2° C./min to 30° C./min.

The temperature rise may be continuous or stepwise (sequential) but is preferably continuous in order for the resulting polyimide film not to have a poor appearance. In the whole temperature range described above, the heating rate may be kept constant or changed midway.

Examples of methods for heating a coating having a single-sheet shape while raising the temperature include raising the temperature in an oven. In this case, the heating rate is adjusted according to the setting of the oven. When a coating having an elongated shape is heated while raising the temperature, for example, a plurality of heating furnaces for heating the coating are disposed along the direction of transport (movement) of the substrate, and the temperatures of the heating furnaces are set to be different from each other. For example, the temperature of each heating furnace may be increased along the direction of movement of the substrate. In this case, the heating rate is adjusted according to the transport speed of the substrate.

As described above, it is preferable to perform heating at a certain temperature for a certain period of time after the temperature rise. The temperature is not particularly limited and preferably a temperature that makes the amount of solvent in the film become 0.5 mass % or less. For example, the temperature may be at or below the glass transition temperature, but the solvent is readily removed at or above the glass transition temperature. Specifically, the heating temperature is preferably 250° C. or higher, more preferably 280° C. or higher, still more preferably 320° C. or higher. The heating time is typically about 0.5 to 2 hours.

The method for heating the coating described above at a certain temperature is not particularly limited, and the coating may be heated, for example, in an oven adjusted to a certain temperature. A coating having an elongated shape may be heated, for example, in a heating furnace kept at a constant temperature.

Here, the polyimide tends to be oxidized when heated at a temperature higher than 200° C. When the polyimide is oxidized, the resulting polyimide film turns yellow, and the total light transmittance of the polyimide film decreases. Thus, in the temperature range higher than 200° C., it is preferred that (i) the atmosphere for heating be an inert gas atmosphere or (ii) the atmosphere for heating be a reduced-pressure atmosphere.

When (i) the atmosphere for heating is an inert gas atmosphere, oxidation reaction of the polyimide is inhibited. The type of inert gas is not particularly limited, and argon gas, nitrogen gas, or the like may be employed. In particular, the oxygen concentration in the temperature range higher than 200° C. is preferably 5 vol % or less, more preferably 3 vol % or less, still more preferably 1 vol % or less. The oxygen concentration in the atmosphere is measured with a commercially available oxygen analyzer (e.g., zirconia oxygen analyzer).

Also when (ii) the atmosphere for heating is a reduced-pressure atmosphere, oxidation reaction of the polyimide is inhibited. When the atmosphere for heating is a reduced-pressure atmosphere, the pressure in the atmosphere is preferably 15 kPa or less, more preferably 5 kPa or less, still more preferably 1 kPa or less. When the atmosphere for heating is a reduced-pressure atmosphere, the coating is heated, for example, in a reduced-pressure oven.

After the imidization (cyclization) of the polyamic acid, the substrate is peeled off to thereby obtain a polyimide film. When the polyimide film is peeled off the substrate, foreign matter may adsorb onto the polyimide film due to peeling electrification. Thus, it is preferred that (i) the substrate be coated with an antistatic agent, or (ii) a static eliminating member (e.g., a static eliminating bar, a static eliminating yarn, or an ion-blowing static eliminator) be installed in a device for applying the polyamic acid or a device for peeling off the polyimide film.

(3) Uses for Film

As described above, the film of the present invention has thermal stability, high bending strength, and high flexibility. The film also has a high total light transmittance, a low coefficient of thermal expansion, and, in addition, a small thickness-direction retardation. Thus, the film is suitable particularly as a panel substrate of a display apparatus. Examples of the display apparatus include touch panels, liquid crystal displays, and organic EL displays.

A touch panel is typically a panel body including (i) a transparent substrate including a transparent electrode (sensing electrode layer), (ii) an adhesive layer, and (iii) a transparent substrate including a transparent electrode (drive electrode layer). The polyimide film described above can be used as both the transparent substrate on the sensing electrode layer side and the transparent substrate on the drive electrode layer side.

A liquid crystal cell of a liquid crystal display apparatus is typically a panel body having a multilayer structure in which (i) a first transparent plate, (ii) a liquid crystal material sandwiched between transparent electrodes, and (iii) a second transparent plate are stacked in this order. The film described above can be used as both the first transparent plate and the second transparent plate. The film described above can also be used as a substrate for a color filter in a liquid crystal display apparatus.

An organic EL panel is typically a panel in which a transparent substrate, an anode transparent electrode layer, an organic EL layer, a cathode reflecting electrode layer, and a counter substrate are stacked in this order. The film described above can be used as both the transparent substrate and the counter substrate.

2. Regarding Method for Producing Display Apparatus

The various display apparatuses described above can be produced by forming an element on the film described above. A description will be given below in the context of using a polyimide film.

A method for producing a display apparatus may include, for example, preparing a polyimide multilayer including a stack of a substrate and a polyimide layer by applying the above-described varnish including a polyamic acid onto a substrate and then imidizing the polyamic acid, peeling off the polyimide layer from the polyimide multilayer to obtain a polyimide film, and forming an element on the polyimide film.

Figure 2A:
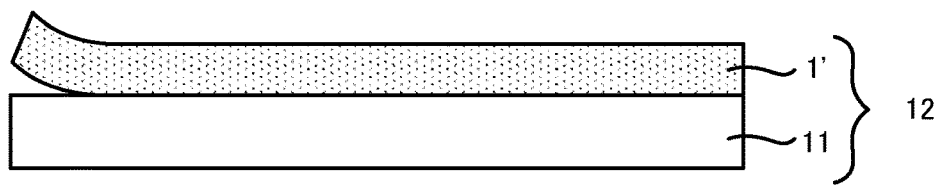
FIGS. 2A and 2B are schematic sectional views illustrating an example of a method for producing a display apparatus including the film of the present invention.
Figure 2B:
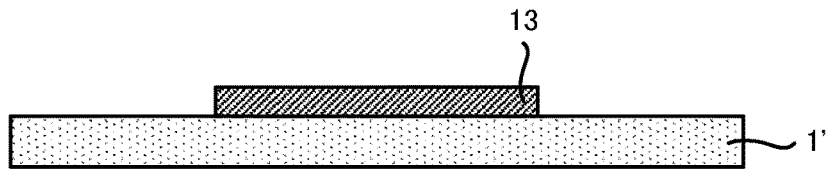

A more specific description will be given with reference to FIGS. 2A and 2B. When the display apparatus is produced, polyimide multilayer 12 including substrate 11 and polyimide layer 1' stacked thereon is first prepared, as illustrated in FIG. 2A. The method for producing polyimide multilayer 12 may be the same as the above-described method for producing a polyimide film. Polyimide layer 1' is then peeled off from polyimide multilayer 12 (FIG. 2A), and element 13 is formed on polyimide layer 1' (FIG. 2B). The element formed on polyimide layer 1' at this time may be, for example, an electrode layer of a touch panel, a color filter of a liquid crystal display apparatus, or an electrode layer or an organic EL layer of an organic EL panel, as described above.

Another method for producing a display apparatus may include, for example, preparing a polyimide multilayer including a stack of a substrate and a polyimide layer by applying the above-described varnish including a polyamic acid onto a substrate and then imidizing the polyamic acid, forming an element on the polyimide layer of the polyimide multilayer, and peeling the polyimide layer off the substrate after the formation of the element.

Figure 3A:
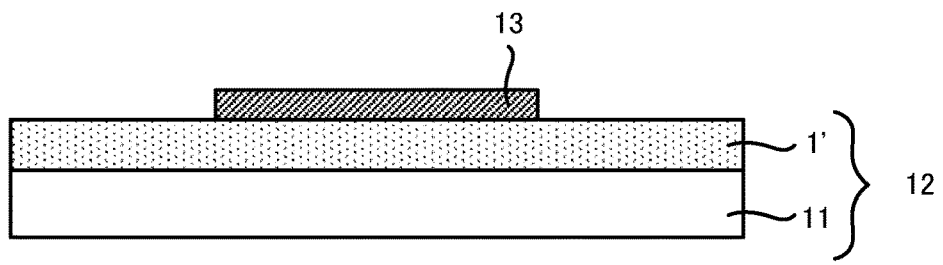
FIGS. 3A to 3C are schematic sectional views illustrating another example of a method for producing a display apparatus including the film of the present invention.
Figure 3B:
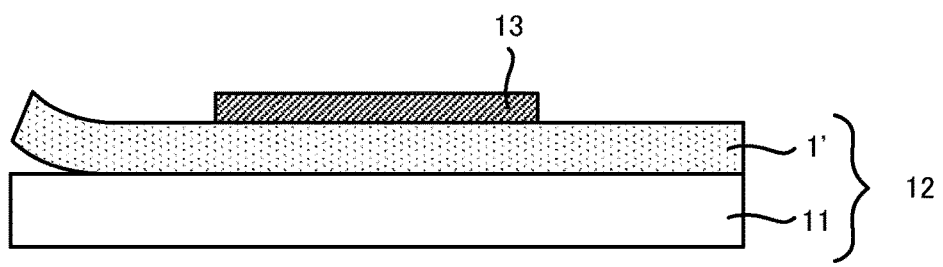
Figure 3C:
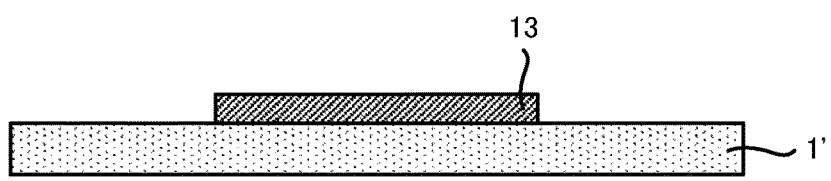

A more specific description will be given with reference to FIGS. 3A to 3C. Polyimide multilayer 12 including substrate 11 and polyimide layer 1' stacked thereon is prepared, and element 13 is formed on polyimide layer 1' (FIG. 3A). In this method, after the formation of element 13, polyimide layer 1' is peeled off substrate 11 (FIG. 3B) to obtain a display apparatus in which element 13 is formed (FIG. 3C). In this method, stress exerted on polyimide layer 1' during the formation of element 13 is likely to be absorbed by substrate 11. Therefore, polyimide layer 1' is unlikely to tear or crack during the formation of element 13.

In the present invention, since (i) the coefficient of thermal expansion, (ii) the absolute value of a thickness-direction retardation, (iii) the glass transition temperature, (iv) the total light transmittance, (v) the b* value in the L*a*b* color system, and (vi) the tensile elongation described above are all satisfied, warp of a film is less likely to occur when a display apparatus is produced, and furthermore, a TFT array in which low-temperature polysilicon is used on the film can also be produced, for example. In addition, the film can also be easily peeled off a substrate (e.g., the substrate of the polyimide multilayer described above) for producing a display apparatus. That is, a high-quality and highly reliable display apparatus can be obtained. Furthermore, distortion and the like are less likely to occur in an image observed in the display apparatus obtained, and the visibility is also good.

EXAMPLES

The present invention will now be described in more detail with reference to examples. However, the scope of the present invention is not limited to the examples.

1. Tetracarboxylic Dianhydride and Diamine Components

The abbreviations of tetracarboxylic dianhydride and diamine components used in Examples and Comparative Examples are as described below.

[Tetracarboxylic Dianhydride Component]
s-BPDA: 3,3',4,4'-Biphenyltetracarboxylic dianhydride
a-BPDA: 2,3,3',4'-Biphenyltetracarboxylic dianhydride
BPAF: Fluorenylidene bisphthalic anhydride

[Diamine Component]
t-DACH: t-Diaminocyclohexane (trans-1,4-diaminocyclohexane)
1,4-BAC: 1,4-Diaminomethylcyclohexane
BAFL: 9,9-Bis(4-aminophenyl)fluorene
1,5-DAN: 1,5-Diaminonaphthalene
4,4'-DAS: 4,4'-Diaminodiphenylsulfone

Synthesis Example 1

In a flask equipped with a thermometer, a condenser, a nitrogen inlet tube, and a stirring blade, t-DACH: 7.19 g (0.063 mol), 1,4-BAC: 1.00 g (0.007 mol), and N-methyl-2-pyrrolidinone (NMP): 179.4 g (corresponding to 15 mass %) were placed and stirred in a nitrogen atmosphere to provide a homogeneous solution. The solution was charged with s-BPDA: 11.33 g (0.039 mol), a-BPDA: 4.12 g (0.014 mol), and BPAF: 8.02 g (0.017 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.17 dL/g and a viscosity at 25° C., as measured with an E-type viscometer, of 38,000 mPa·s.

Synthesis Example 2

In the same reactor as in Synthesis Example 1, t-DACH: 7.99 g (0.070 mol) and N-methyl-2-pyrrolidinone (NMP): 178.3 g (corresponding to 15 mass %) were placed and stirred in a nitrogen atmosphere to provide a homogeneous solution. The solution was charged with s-BPDA: 11.33 g (0.039 mol), a-BPDA: 4.12 g (0.014 mol), and BPAF: 8.02 g (0.017 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.08 dL/g and a viscosity at 25° C., as measured with an E-type viscometer, of 34,000 mPa·s.

Synthesis Example 3

In the same reactor as in Synthesis Example 1, t-DACH: 4.11 g (0.036 mol), BAFL: 1.39 g (0.004 mol), and N-methyl-2-pyrrolidinone (NMP): 74.3 g (corresponding to 20 mass %) were placed and stirred in a nitrogen atmosphere to provide a homogeneous solution. The solution was charged with s-BPDA: 7.06 g (0.024 mol), a-BPDA: 2.35 g (0.008 mol), and BPAF: 3.67 g (0.008 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.74 dL/g and a viscosity at 25° C., as measured with an E-type viscometer, of 32,000 mPa·s.

Synthesis Example 4

In the same reactor as in Synthesis Example 1, t-DACH: 6.39 g (0.056 mol), 1,4-BAC: 1.00 g (0.007 mol), BAFL: 2.44 g (0.007 mol), and N-methyl-2-pyrrolidinone (NMP): 151.7 g (corresponding to 18 mass %) were placed and stirred in a nitrogen atmosphere to provide a homogeneous solution. The solution was charged with s-BPDA: 12.36 g (0.042 mol), a-BPDA: 3.09 g (0.011 mol), and BPAF: 8.02 g (0.017 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.99 dL/g and a viscosity at 25° C., as measured with an E-type viscometer, of 17,000 mPa·s.

Synthesis Example 5

In the same reactor as in Synthesis Example 1, t-DACH: 7.99 g (0.070 mol) and N-methyl-2-pyrrolidinone (NMP): 188.1 g (corresponding to 15 mass %) were placed and stirred in a nitrogen atmosphere to provide a homogeneous solution. The solution was charged with s-BPDA: 10.30 g (0.035 mol), a-BPDA: 2.06 g (0.007 mol), and BPAF: 12.84 g (0.028 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.24 dL/g and a viscosity at 25° C., as measured with an E-type viscometer, of 41,000 mPa·s.

Synthesis Example 6

In the same reactor as in Synthesis Example 1, t-DACH: 8.56 g (0.075 mol) and N-methyl-2-pyrrolidinone (NMP): 201.5 g (corresponding to 15 mass %) were placed and stirred in a nitrogen atmosphere to provide a homogeneous solution. The solution was charged with s-BPDA: 13.24 g (0.045 mol) and BPAF: 12.84 g (0.028 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.22 dL/g and a viscosity at 25° C., as measured with an E-type viscometer, of 33,000 mPa·s.

Synthesis Example 7

In a flask equipped with a thermometer, a condenser, a nitrogen inlet tube, and a stirring blade, t-DACH: 5.60 g (0.049 mol), 1,4-BAC: 2.99 g (0.021 mol), and N-methyl-2-pyrrolidinone (NMP): 181.6 g (corresponding to 15 mass %) were placed and stirred in a nitrogen atmosphere to provide a homogeneous solution. The solution was charged with s-BPDA: 15.45 g (0.053 mol) and BPAF: 8.02 g (0.017 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.12 dL/g and a viscosity at 25° C., as measured with an E-type viscometer, of 39,000 mPa·s.

Synthesis Example 8

In the same reactor as in Synthesis Example 1, t-DACH: 4.80 g (0.042 mol), BAFL: 6.27 g (0.018 mol), and N-methyl-2-pyrrolidinone (NMP): 168.3 g (corresponding to 15 mass %) were placed and stirred in a nitrogen atmosphere to provide a homogeneous solution. The solution was charged with s-BPDA: 15.89 g (0.054 mol) and BPAF: 2.75 g (0.006 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.96 dL/g and a viscosity at 25° C., as measured with an E-type viscometer, of 9,500 mPa·s.

Synthesis Example 9

In the same reactor as in Synthesis Example 1, 1,4-BAC: 8.53 g (0.060 mol), 1,5-DAN: 3.16 g (0.020 mol), 4,4'-DAS: 4.97 g (0.020 mol), and N,N-dimethylacetamide (DMAc): 197.5 g (corresponding to 20 mass %) were placed and stirred in a nitrogen atmosphere to provide a homogeneous solution. The solution was charged with s-BPDA: 23.54 g (0.080 mol) and BPAF: 9.17 g (0.020 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.35 dL/g and a viscosity at 25° C., as measured with an E-type viscometer, of 298 mPa·s.

Synthesis Example 10

In the same reactor as in Synthesis Example 1, t-DACH: 7.99 g (0.070 mol) and N-methyl-2-pyrrolidinone (NMP) 188.1 g (corresponding to 15 mass %) were placed and stirred in a nitrogen atmosphere to provide a homogeneous solution. The solution was charged with a-BPDA: 12.36 g (0.042 mol) and BPAF: 12.84 g (0.028 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.57 dL/g and a viscosity at 25° C., as measured with an E-type viscometer, of 924 mPa·s.

Synthesis Example 11

In the same reactor as in Synthesis Example 1, t-DACH: 11.42 g (0.100 mol) and N-methyl-2-pyrrolidinone (NMP): 186.1 g (corresponding to 18 mass %) were placed and stirred in a nitrogen atmosphere to provide a homogeneous solution. The solution was charged with a-BPDA: 14.71 g (0.050 mol) and s-BPDA: 14.71 g (0.050 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 0.64 dL/g and a viscosity at 25° C., as measured with an E-type viscometer, of 13,170 mPa·s.

Synthesis Example 12

In the same reactor as in Synthesis Example 1, 1,4-BAC: 9.96 g (0.070 mol) and N-methyl-2-pyrrolidinone (NMP): 189.4 g (corresponding to 15 mass %) were placed and stirred in a nitrogen atmosphere to provide a homogeneous solution. The solution was charged with s-BPDA: 11.33 g (0.039 mol), a-BPDA: 4.12 g (0.014 mol), and BPAF: 8.02 g (0.017 mol) in the form of powder; heat generation occurred slowly, and the formation of a white salt was observed. The temperature of the solution was raised to allow the reaction to proceed at an inner temperature of 80° C. to 85° C. for 1 hour, resulting in a homogeneous solution. The solution was then cooled to room temperature and aged overnight at room temperature to obtain a pale yellow viscous varnish. The polyamic acid varnish obtained had an inherent viscosity: ηinh (measured with an Ubbelohde viscometer, polymer concentration: 0.5 g/dL, NMP, 25° C.) of 1.02 dL/g and a viscosity at 25° C., as measured with an E-type viscometer, of 5,610 mPa·s.

Example 1

The polyamic acid varnish prepared in Synthesis Example 1 was applied onto a glass substrate with a doctor blade to form a coating of the polyamic acid varnish. The multilayer formed of the substrate and the coating of the polyamic acid varnish was placed in an inert oven. Thereafter, the oxygen concentration in the inert oven was regulated to 0.1 vol % or less, and the temperature of the atmosphere in the oven was raised from 50° C. to 350° C. over 2 hours and 30 minutes (heating rate: 2° C./min) and further held at 350° C. for 1 hour. After the heating was finished, natural cooling was further performed in an inert atmosphere. The resulting sample was immersed in distilled water, and a polyimide film was peeled off the substrate. The thickness and various physical properties of the polyimide film obtained are shown in Table 1.

Examples 2 to 5 and Comparative Examples 1 to 4, 6, and 7

Polyimide films were each produced in the same manner as in Example 1 except that the polyamic acid varnish was replaced with polyamic acid varnishes shown in Table 1.

Comparative Example 5

In the same manner as in Example 1 except that the polyamic acid varnish was replaced with polyamic acid varnishes shown in Table 1, a coating was formed on a glass substrate, heated in an inert oven, and then naturally cooled in an inert atmosphere. The coating was cracked, and a film could not be formed.

[Evaluation]

The polyimide films produced in Examples and Comparative Examples were measured for (i) coefficient of thermal expansion (CTE), (ii) thickness-direction retardation (Rth) per 10 μm thickness, (iii) glass transition temperature (Tg), (iv) total light transmittance, (v) b* value in the L*a*b* color system, and (vi) tensile elongation (EL) by the following methods. The results are shown in Table 1.

Measurement of (i) Coefficient of Thermal Expansion (CTE) and (iii) Glass Transition Temperature (Tg)

The polyimide films produced in Examples and Comparative Examples were each cut to a width of 4 mm and a length of 20 mm. The samples were measured for their coefficient of thermal expansion (CTE) and glass transition temperature (Tg) by using a thermomechanical analyzer (TMA-50) manufactured by Shimadzu Corporation. More specifically, the temperature of each polyimide film was raised from 100° C. to 200° C. at a heating rate of 5° C./min, and a coefficient of thermal expansion was plotted every second (i.e., at 0.083° C. intervals). The average value of coefficient of thermal expansions plotted in the range of 100° C. to 200° C. was employed as the average coefficient of thermal expansion in the range of 100° C. to 200° C. The calculated average coefficient of thermal expansion is shown in Table 1.

Calculation of (ii) Thickness-Direction Retardation (Rth) Per 10

Using an optical material inspection apparatus (RETS-100 model) manufactured by Otsuka Electronics Co., Ltd., the refractive index nx in the X-axis direction, the refractive index ny in the Y-axis direction, and the refractive index nz in the Z-axis direction of the polyimide films produced in Examples and Comparative Examples were measured at room temperature (20° C. to 25° C.) by using light with a wavelength of 550 nm. From the refractive index nx in the X-axis direction, the refractive index ny in the Y-axis direction, the refractive index nz in the Z-axis direction, and the thickness (d) of the film, the absolute value of Rth was calculated based on the following expression.

$$\text{Absolute value of } Rth \text{ (nm)} = |[nz-(nx+ny)/2] \times d|$$

The calculated value was then converted into a value per 10 μm of the thickness (d) of the film.

Measurement of (iv) Total Light Transmittance

The total light transmittance of the polyimide films produced in Examples and Comparative Examples was measured with a light source D65 in accordance with JIS-K 7361 using an NDH2000 haze meter manufactured by Nippon Denshoku Industries Co., Ltd.

Measurement of (v) b* Value in L*a*b* Color System

For the polyimide films produced in Examples and Comparative Examples, the b* value, an indicator of yellowness of the polyimide films, was measured in a transparent mode using a direct-reading tristimulus colorimeter (Colour Cute iCC-i model) manufactured by Suga Test Instruments Co., Ltd.

Measurement of (vi) Tensile Elongation

The polyimide films produced in Examples and Comparative Examples were each processed into a shape illustrated in FIG. 1 to prepare a sample. Its tensile elongation was measured using a Shimadzu compact table-top tester EZ-S (analysis software; TRAPEZIUM2). The conditions of the measurement of tensile elongation were set as follows.

(Test Conditions)

Length of A in FIG. 1: 50 mm

Length of B in FIG. 1: 10 mm

Length of C in FIG. 1: 20 mm

Length of D in FIG. 1: 5 mm

Measurement environment: 23° C. and 50% Rh

Chuck distance: 30 mm

Tensile speed: 30 mm/min

The tensile elongation was determined by the following expression.

Tensile elongation={(film length at break in tensile test–film length before tensile test)/film length before tensile test}×100

TABLE 1

| | Synthesis Example | Tetracarboxylic dianhydride component (content molar ratio) | Diamine component (content molar ratio) | Thickness (μm) | (i) Average coefficient of thermal expansion in range of 100° C. to 200° C. (ppm/K) | (ii) Thickness-direction retardation per 10 μm (nm) | (iii) Tg (° C.) | (iv) Total light transmittance (%) | (v) b* value | (vi) Tensile elongation (%) |
|---|---|---|---|---|---|---|---|---|---|---|
| Example 1 | 1 | s-BPDA/a-BPDA/BPAF (55/20/25) | t-DACH/1,4-BAC (90/10) | 15 | 30 | 156 | 356 | 89 | 1.9 | 13 |
| Example 2 | 2 | s-BPDA/a-BPDA/BPAF (55/20/25) | t-DACH | 15 | 27 | 192 | 366 | 89 | 1.6 | 12 |
| Example 3 | 3 | s-BPDA/a-BPDA/BPAF (60/20/20) | t-DACH/BAFL (90/10) | 19 | 34 | 171 | 367 | 89 | 3.4 | 11 |
| Example 4 | 4 | s-BPDA/a-BPDA/BPAF (60/15/25) | t-DACH/1,4-BAC/BAFL (80/10/10) | 16 | 35 | 145 | 357 | 89 | 2.9 | 11 |
| Example 5 | 5 | s-BPDA/a-BPDA/BPAF (50/10/40) | t-DACH | 15 | 31 | 133 | 369 | 89 | 1.8 | 10 |
| Comparative Example 1 | 6 | S-BPDA/BPAF (60/40) | t-DACH | 14 | 32 | 143 | 351 | 89 | 1.9 | 8 |
| Comparative Example 2 | 7 | S-BPDA/BPAF (75/25) | t-DACH/1,4-BAC (70/30) | 16 | 23 | 154 | 326 | 89 | 1.4 | 10 |
| Comparative Example 3 | 8 | s-BPDA/BPAF (90/10) | t-DACH/BAFL (70/30) | 14 | 32 | 230 | 373 | 88 | 4.4 | 8 |
| Comparative Example 4 | 9 | S-BPDA/BPAF (80/20) | 1,4-BAC/1,5-DAN/4,4'-DAS (60/20/20) | 26 | 29 | 101 | 330 | 88 | 7.4 | 7 |
| Comparative Example 5 | 10 | a-BPDA/BPAF (60/40) | t-DACH | | | film not formed | | | | |
| Comparative Example 6 | 11 | S-BPDA/a-BPDA (50/50) | t-DACH | 19 | 33 | 286 | 338 | 88 | 3.2 | 16 |
| Comparative Example 7 | 12 | s-BPDA/a-BPDA/BPAF (55/20/25) | 1,4-BAC | 14 | 49 | 16 | 278 | 88 | 3.4 | 9 |

As shown in Table 1, when the tetracarboxylic dianhydride component included three components: s-BPDA, a-BPDA, and BPAF, and the diamine component included t-DACH, polyimide films satisfying all the requirements (i) to (vi) described above were obtained (Examples 1 to 5).

In contrast, when the tetracarboxylic dianhydride component did not include s-BPDA, a film was not formed (Comparative Example 5). When the tetracarboxylic dianhydride component did not include a-BPDA, the tensile elongation particularly tended to be low (Comparative Examples 1 to 4). When the tetracarboxylic dianhydride component did not include BPAF, the thermal stability (glass transition temperature) decreased (Comparative Example 6).

Furthermore, when the diamine component did not include t-DACH, the coefficient of thermal expansion tended to be high, and, in addition, the Tg tended to be low (Comparative Example 7).

This application claims priority from Japanese Patent Application No. 2018-118621 filed Jun. 22, 2018. The entire contents described in the Description and drawings of this application are incorporated herein by reference.

INDUSTRIAL APPLICABILITY

The film of the present invention has high heat resistance, high bending strength, high flexibility, and, furthermore, a small thickness-direction retardation and a low coefficient of thermal expansion. In addition, the film has high visible light transmittance and is less likely to be colored. Thus, the film can be used as a panel substrate for various display apparatuses.

REFERENCE SIGNS LIST

1' Polyimide layer
11 Substrate
12 Polyimide multilayer
13 Element

The invention claimed is:
1. A polymer film comprising a polyimide that is a polymer of a diamine component and a tetracarboxylic dianhydride component, wherein
   the diamine component includes t-diaminocyclohexane,
   the tetracarboxylic dianhydride component includes
   a tetracarboxylic dianhydride A represented by general formula (a) or general formula (b):

[General formula 1]

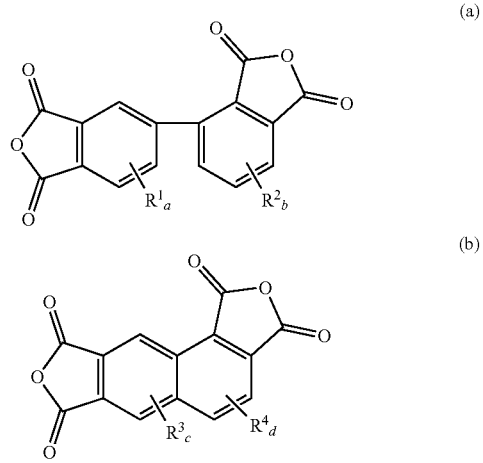

wherein, in general formulae (a) and (b), $R^1$, $R^2$, $R^3$, and $R^4$ each independently represent an alkyl group having 1 to 4 carbon atoms, and a, b, c, and d each represent an integer of 0 to 3 (provided that a+b is 3 or less, and c+d is 3 or less), a tetracarboxylic dianhydride B represented by general formula (c) or general formula (d):

[General formula 2]

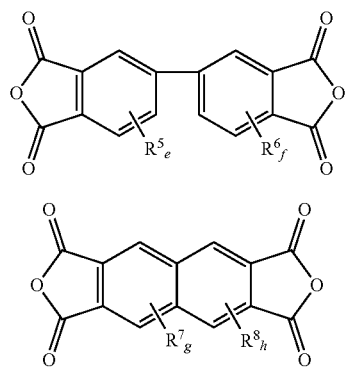

wherein, in general formulae (c) and (d), $R^5$, $R^6$, $R^7$, and $R^8$ each independently represent an alkyl group having 1 to 4 carbon atoms, and e, f, g, and h each represent an integer of 0 to 3 (provided that e+f is 3 or less, and g+h is 3 or less), and a tetracarboxylic dianhydride C represented by general formula (e):

[General formula 3]

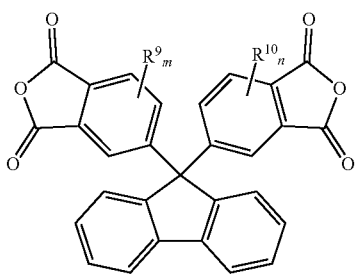

wherein, in general formula (e), $R^9$ and $R^{10}$ each independently represent an alkyl group having 1 to 4 carbon atoms, and m and n each represent an integer of 0 to 3 (provided that m+n is 3 or less);

t-diaminocyclohexane is included in an amount of 90 mol % to 100 mol % based on the total amount of the diamine component; and the polymer film satisfies all requirements (i) to (vi):

(i) to have an average coefficient of thermal expansion in a range of 100° C. to 200° C. of 35 ppm/K or less;

(ii) to have a thickness-direction retardation whose absolute value is 200 nm or less per 10 μm thickness;

(iii) to have a glass transition temperature of 340° C. or higher;

(iv) to have a total light transmittance of 85% or more;

(v) to have a b* value in the L*a*b* color system of 5 or less; and (vi) to have a tensile elongation of 10% or more.

2. The polymer film according to claim 1, wherein the diamine component further includes at least one of 1,4-diaminomethylcyclohexane and 9,9-bis(4-aminophenyl)fluorene.

3. The polymer film according to claim 1, wherein the tetracarboxylic dianhydride A, the tetracarboxylic dianhydride B, and the tetracarboxylic dianhydride C are included in amounts of 2 mol % to 50 mol %, 30 mol % to 80 mol %, and 2 mol % to 50 mol %, respectively, based on the total amount of the tetracarboxylic dianhydride.

4. A polyamic acid that is a polymer of a diamine component and a tetracarboxylic dianhydride component, wherein the diamine component includes t-diaminocyclohexane, the tetracarboxylic dianhydride component includes a tetracarboxylic dianhydride A represented by general formula (a) or general formula (b):

[General formula 4]

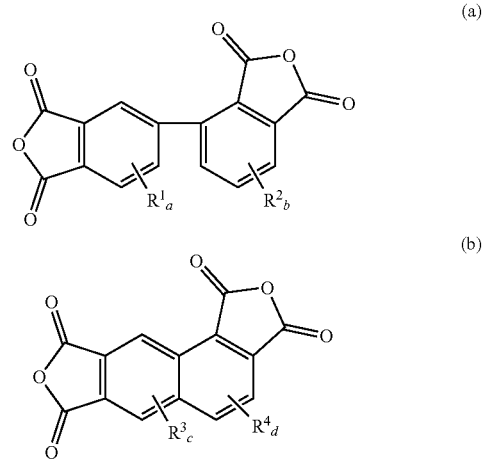

wherein, in general formulae (a) and (b), $R^1$, $R^2$, $R^3$, and $R^4$ each independently represent an alkyl group having 1 to 4 carbon atoms, and a, b, c, and d each represent an integer of 0 to 3 (provided that a+b is 3 or less, and c+d is 3 or less), a tetracarboxylic dianhydride B represented by general formula (c) or general formula (d):

[General formula 5]

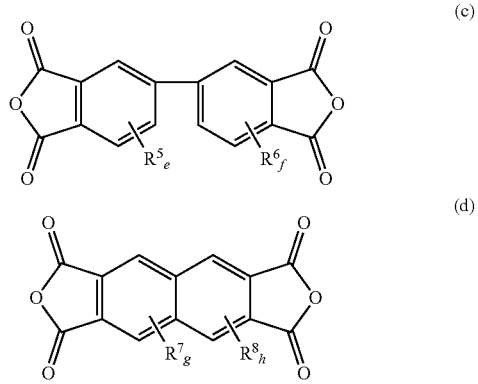

wherein, in general formulae (c) and (d), $R^5$, $R^6$, $R^7$, and $R^8$ each independently represent an alkyl group having 1 to 4 carbon atoms, and e, f, q, and h each represent an integer of 0 to 3 (provided that e+f is 3 or less, and g+h is 3 or less), and a tetracarboxylic dianhydride C represented by general formula (e):

[General formula 6]

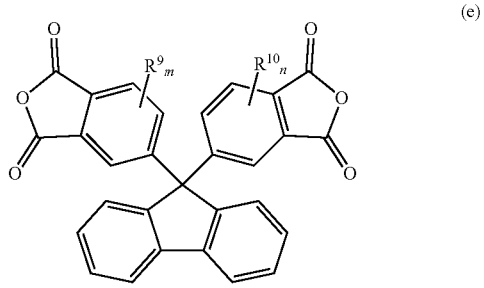

wherein, in general formula (e), $R^9$ and $R^{10}$ each independently represent an alkyl group having 1 to 4 carbon atoms, and m and n each represent an integer of 0 to 3 (provided that m+n is 3 or less;

t-diaminocyclohexane is included in an amount of 90 mol % to 100 mol % based on the total amount of the diamine component, and a polyimide film obtained by imidizing the polyamic acid satisfies all requirements (i) to (vi):

(i) to have an average coefficient of thermal expansion in a range of 100° C. to 200° C. of 35 ppm/K or less;

(ii) to have a thickness-direction retardation whose absolute value is 200 nm or less per 10 μm thickness;

(iii) to have a glass transition temperature of 340° C. or higher;

(iv) to have a total light transmittance of 85% or more;

(v) to have a b* value in the L*a*b* color system of 5 or less; and (vi) to have a tensile elongation of 10% or more.

5. The polyamic acid according to claim 4, wherein
the diamine component further includes at least one of 1,4-diaminomethylcyclohexane and 9,9-bis(4-aminophenyl)fluorene.

6. The polyamic acid according to claim 4, wherein
the tetracarboxylic dianhydride A, the tetracarboxylic dianhydride B, and the tetracarboxylic dianhydride C are included in amounts of 2 mol % to 50 mol %, 30 mol % to 80 mol %, and 2 mol % to 50 mol %, respectively, based on the total amount of the tetracarboxylic dianhydride.

7. A polyamic acid varnish comprising the polyamic acid according to claim 4.

8. A method for producing a polyimide multilayer including a stack of a substrate and a polyimide layer, the method comprising:
applying the polyamic acid varnish according to claim 7 onto a substrate; and
heating a coating of the polyamic acid varnish in an inert gas atmosphere to cause imidization.

9. A method for producing a polyimide multilayer including a stack of a substrate and a polyimide layer, the method comprising:
applying the polyamic acid varnish according to claim 7 onto a substrate; and
heating a coating of the polyamic acid varnish in an atmosphere at 15 kPa or less to cause imidization.

10. A method for producing a polyimide film, comprising peeling off a substrate from a polyimide multilayer obtained by the method for producing a polyimide multilayer according to claim 8.

11. A method for producing a polyimide film, comprising peeling off a substrate from a polyimide multilayer obtained by the method for producing a polyimide multilayer according to claim 9.

12. A touch panel display comprising the polymer film according to claim 1.

13. A liquid crystal display comprising the polymer film according to claim 1.

14. An organic EL display comprising the polymer film according to claim 1.

* * * * *